Dec. 1, 1942.     R. A. MILLER ET AL     2,303,885
PROCESS OF PREPARING CELLULAR MATERIALS
Filed Feb. 8, 1938     3 Sheets-Sheet 1
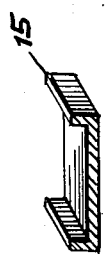
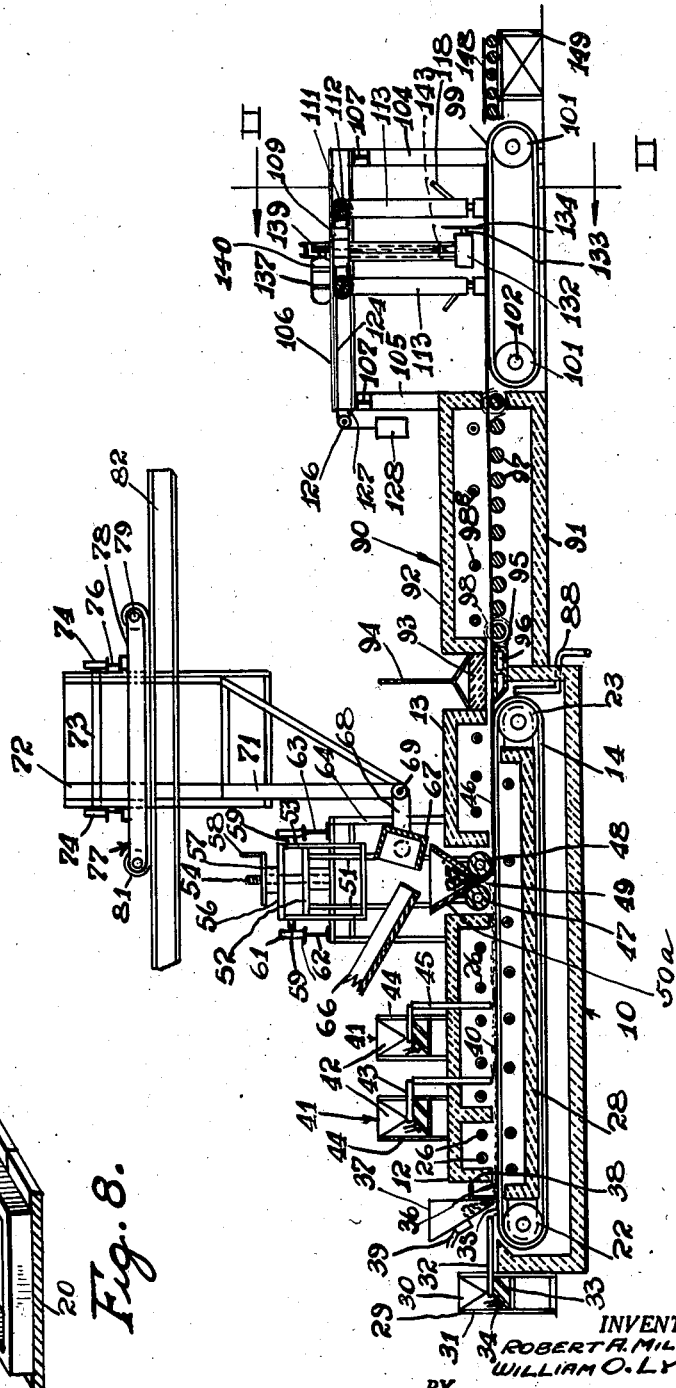
INVENTORS.
ROBERT A. MILLER AND
WILLIAM O. LYTLE
BY Bradley & Bee
ATTORNEYS.

Dec. 1, 1942.   R. A. MILLER ET AL   2,303,885
PROCESS OF PREPARING CELLULAR MATERIALS
Filed Feb. 8, 1938   3 Sheets-Sheet 2

INVENTORS.
ROBERT A. MILLER AND
BY WILLIAM O. LYTLE
Bradley & Bee
ATTORNEYS.

Dec. 1, 1942.  R. A. MILLER ET AL  2,303,885
PROCESS OF PREPARING CELLULAR MATERIALS
Filed Feb. 8, 1938  3 Sheets-Sheet 3
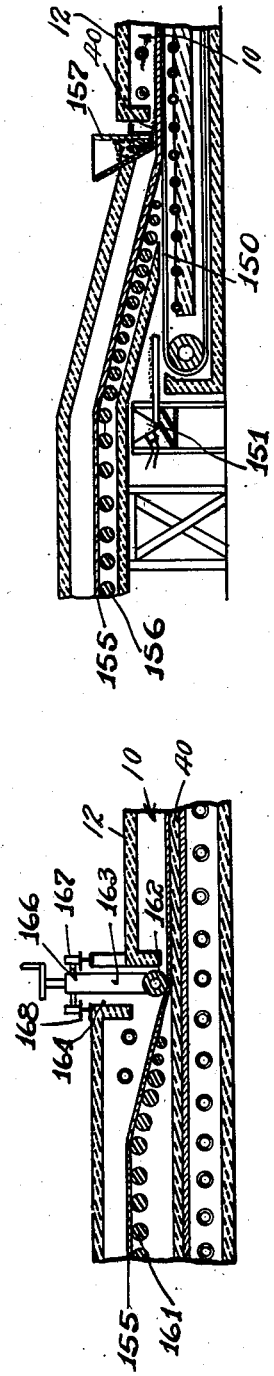
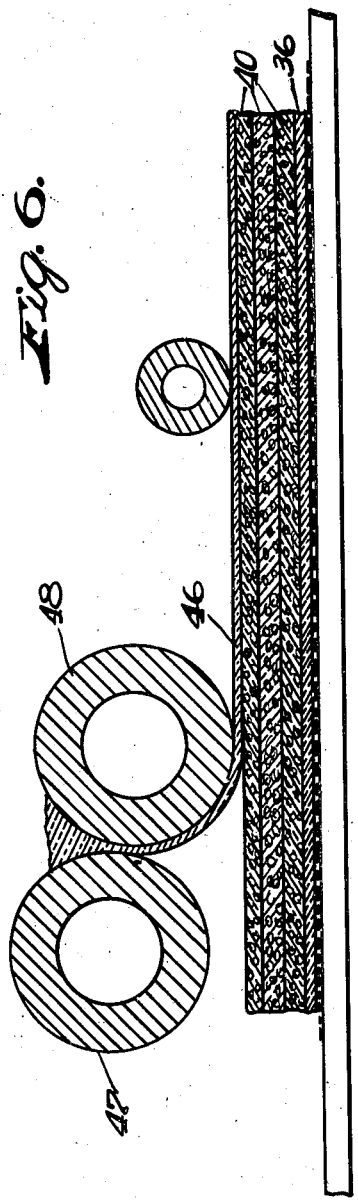
INVENTORS.
ROBERT A. MILLER AND
WILLIAM O. LYTLE
BY Bradley & Bee
ATTORNEYS.

Patented Dec. 1, 1942

2,303,885

UNITED STATES PATENT OFFICE 2,303,885

PROCESS OF PREPARING CELLULAR MATERIALS

Robert A. Miller, Tarentum, and William O. Lytle, New Kensington, Pa., assignors to Pittsburgh Plate Glass Company, a corporation of Pennsylvania Application February 8, 1938, Serial No. 189,338

2 Claims. (Cl. 49—87)

The present invention relates to the manufacture of cellular materials suitable for use as heat insulating media, and as a light weight building material, and it has particular relation to processes of and apparatus for manufacturing such materials from blast furnace slag or similar relatively refractory materials.

The main object of the invention is to provide a process of and apparatus for manufacturing cellular bodies of glass or slag, which is substantially continuous in operation and which requires a minimum expenditure of time and manual labor.

It has heretofore been proposed to manufacture or prepare bricks or blocks of cellular glass suitable for use as heat insulating media by introducing a suitable gas-producing agent into molten glass in a mold, or by heating the mixture of crushed or ground glass and a suitable gassing medium in a mold in order to fuse the particles of glass together as a coherent mass. In either process the liberation of gas from the gassing medium by reason of the heat from the molten glass produced a bubbly mass of relatively low specific gravity and having relatively high resistance to the transmission of heat. In such processes considerable labor and time were required in manually filling the molds and then further heating them in order to decompose the gassing agent and/or sinter the glass.

According to the provisions of the present invention the foregoing difficulties are obviated by forming a mixture of crushed glass or glass-forming ingredients and a suitable gassing agent and distributing them as a uniform layer upon a suitable conveyor which is then passed through a furnace of any suitable type, in order to fuse the materials and liberate the gases as bubbles in the layer.

For a better understanding of the invention reference may now be had to the accompanying drawings and the description pertaining thereto in which like numerals refer to like parts throughout.

Figure 1 is a cross-sectional view taken longitudinally through a suitable embodiment of apparatus for use in practicing the invention.

Figure 4 is a fragmentary cross-sectional view illustrating a modified form of apparatus for providing a substantially homogeneous top covering for the cellular glass sheet.

Figure 5 is a fragmentary cross-sectional view of the modified form of apparatus for providing a bottom covering for the sheet similar to the top covering disclosed in Figure 4.

Figure 6 is a fragmentary cross-sectional view showing on an enlarged scale suitable means for laying molten glass as a homogeneous sheet upon the sheet of cellular glass.

Figure 7 is a cross-sectional view showing the contour of a link element which may be employed in constructing the conveyor embodied in Figure 1.

Figure 8 is a fragmentary cross-sectional view showing on a larger scale a further modification of the link shown in Figure 7.

Figure 2:
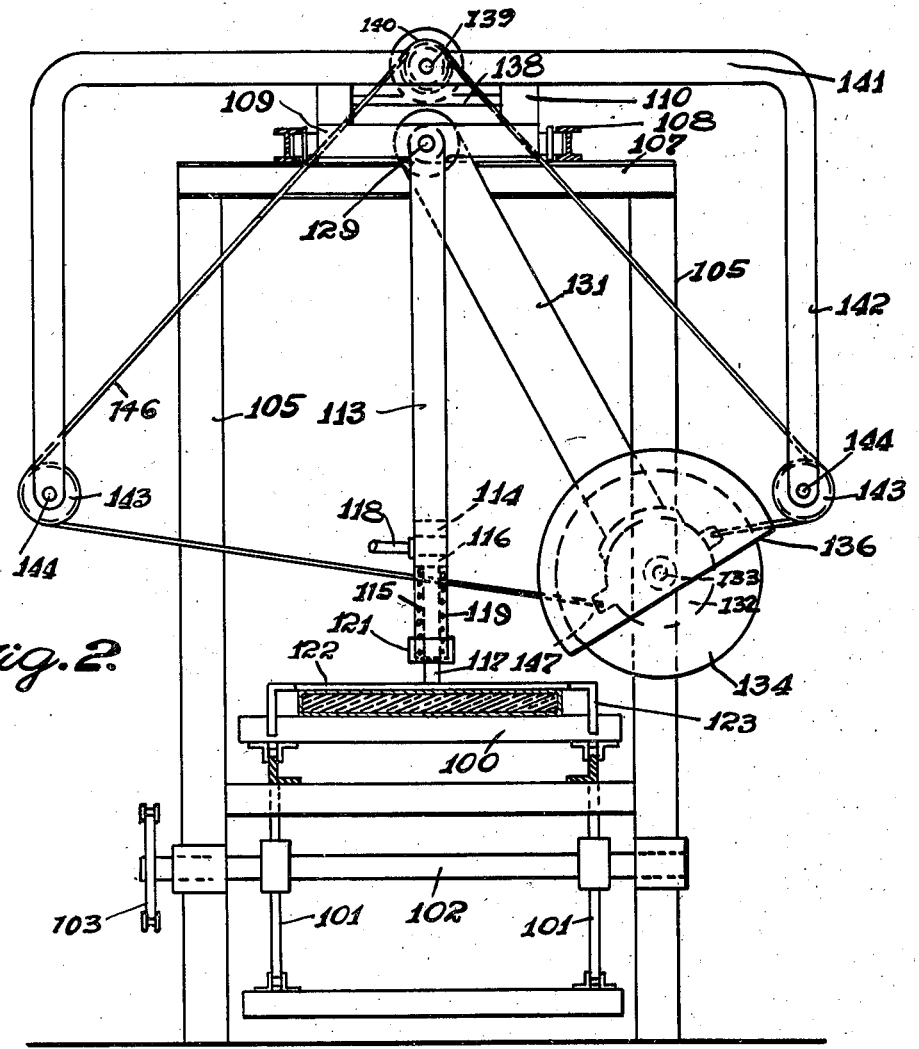
Figure 2 is a cross-sectional view taken substantially upon the line II—II of Figure 1 and illustrating an embodiment of apparatus suitable for cutting the continuous sheet of cellular glass into sections.

In the form of the invention disclosed in Figure 1, a furnace or heating chamber 10, having spaced top or covering sections 12 and 13 vertically spaced therefrom, is provided with a horizontal conveyor 14. The conveyor is formed of relatively refractory material or a highly heat-resistant steel and may be sufficiently thin and flexible to admit of its formation as a continuous belt or band, or it may comprise a plurality of relatively rigid units suitably hinged together to form a continuous chain. The upper surface of these units may be plain or as shown in Figure 7 may have upturned lateral edges 15 to provide a channel in which the cellular material is suitably confined. In the form of the invention disclosed in Figure 8 grids 20 comprising bars 21 are laid upon or are secured upon the conveyor to form a series of mold-like sections that serve to shape the cellular material into blocks as it is formed. The conveyor is trained about suitable rollers or sprockets 22 and 23, one of which is driven by means of a motor (not shown) and which are journaled in the side walls of the chamber. Heat is supplied to the chamber by means of heating elements 26, which may be electrical resistance elements or gas jets as preferred, spaced at suitable intervals along the upper reach of the chain. The lower reach of the chain may be protected from the heat from these elements by means of a horizontal partition 28 which extends between the two reaches, transversely of the chamber.

Since molten glass tends to adhere to heated metals, it is desirable in some cases thinly to coat the upper surface of the conveyor chain with a refractory pulverulent material such as ground fire-clay or similar material prior to application of the glass-forming materials thereto. Apparatus 29 for performing this function comprises a hopper 30 supported by a suitable framework 31 adjacent to the rear extremity of the chamber 10. This hopper discharges into a feeding mechanism which may comprise a pan-like chute 32 supported upon parallel links or leaf springs 33, that are vibrated by a suitable electrical vibrator 34 of conventional design, in order to secure a uniform flow of pulverulent material from the hopper. The forward extremity of this chute extends through an opening 35 in the rear extremity of the chamber over the conveyor in such manner that the pulverulent material falls thereupon prior to the application of the materials for forming the cellular glass.

In order to provide a non-porous covering or backing layer 36 for the cellular glass, crushed glass or cullet may be distributed as a thin layer upon the conveyor immediately after the application of the pulverulent material. The crushed glass for this purpose is contained in a hopper 37 which is disposed in the opening 35 immediately above the conveyor and is supported upon a transversely-extending angle member 38 mounted in any convenient manner. An electrical vibrator 39 secured to the hopper imparts sufficient movement thereto to insure the uniform feed of the crushed or pulverulent glass from the hopper.

Materials for forming the cellular sheet are deposited as layers 40 upon the conveyor by suitable units 41 of which any convenient number, for example 2, may be provided. These units are substantially similar to the one described for the application of the fire-clay and comprise hoppers 42 which discharge into vibratory chutes 43 of tray-like construction. These units are supported upon a framework 44 upon the section 12 of the top of the heating chamber and the material from the hoppers is discharged downwardly through the top 12 of the heating chamber from the chutes 43 through vertical chutes 45.

Apparatus for applying a top film or skin 46 of non-porous glass to the cellular sheet may comprise a pair of rollers 47 and 48 disposed in the space 49 between the sections 12 and 13 of the top of the heating chamber. These rollers are driven by means (not shown) and are mounted for rotation in bearings secured at the lower extremities of a pair of rigid perpendicular bars 51, which in turn are secured at their upper extremities to a cross-bar 52 that slides between guides 53. Vertical adjustment of the cross-bar 52 and of the rollers dependent therefrom is secured by means of a vertical screw 54 having a swivel connection at its lower extremity in the cross-bar and extending at its upper extremity through a second cross-bar 56 which is secured transversely of guides 53. This screw is actuated longitudinally by means of a nut 57 having a crank 58 secured thereto.

Horizontal shafts 59 are rotatably secured to the guides 53 and are provided at their extremities with flanged wheels 61 which travel upon tracks 62 and 63 in order to admit of transverse movement of the rollers 47 and 48, in case it becomes necessary to obtain entrance to the heating chamber through the space between the sections 12 and 13. The rails 62 and 63 and the remainder of the roll supporting structure mounted thereupon are borne upon a suitable framework 64 which rests upon the sections 12 and 13.

Molten glass is fed between the rollers 47 and 48 either by means of a chute 66 extending to a melting tank (not shown) or by means of a tilting pot 67. The latter is secured upon the extremities of arms 68 which are keyed upon a shaft 69. The shaft in turn is journaled in the lower extremities of downwardly-extending arms 71 which at their upper extremities are secured to a car 72. This car is provided with horizontal axles 73 having wheels 74 upon the extremities thereof which travel upon tracks 76 that extend transversely of the heating chamber 10. The tracks are mounted for longitudinal movement with respect to the heating chamber upon a truck 77 comprising beams 78 in which are journaled axles 79, having wheels 81 mounted upon the extremities thereof. These wheels in turn travel upon tracks 82 mounted above and longitudinally of the heating chamber upon any convenient support (not shown).

For purposes of slightly cooling the sheet of cellular glass and for assisting in detaching it from the surface of the conveyor, a blast of air may be directed against the lower surface thereof at the forward extremity of the conveyor by means of a conduit 88 which extends through the wall of the chamber 10.

An annealing leer 90 is disposed in advance of the chamber 10 and comprises a bottom section 91 which abuts the forward end of the heating chamber and a top section 92 which is forwardly spaced with respect to the cover section 13 of the heating chamber. The space between the sections 13 and 92 may be closed by means of a removable plate 93 supported by chains or cables 94. A slip plate 95 which may have chambers 96 to admit of the introduction of a cooling fluid is disposed in a position intermediate of the heating chamber 10 and the leer 90 in order to support the freshly formed sheet of cellular glass during its transition from one chamber to the other.

The glass sheet is carried through a leer upon rollers 97, some or all of which may be driven by means of sprockets 98 upon one extremity thereof. The leer is further provided with means for regulating the temperature thereof, such means comprising for example heating coils or preferably tubes 98B which may be employed either as gas burners or as refractory tubes, through which gases that may be either hot or cold for purposes of controlling the temperature, may be conducted.

Figure 3:
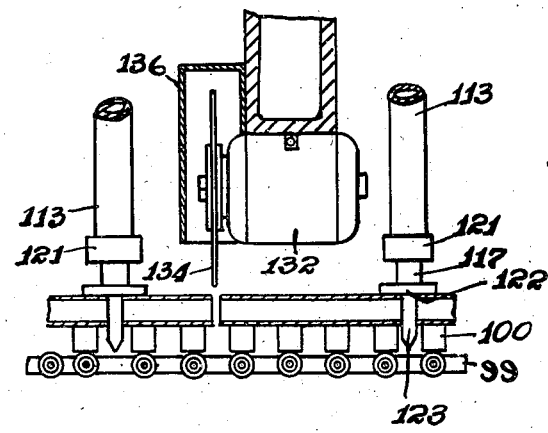
Figure 3 is a fragmentary view of the cutting mechanism disclosed in Figure 2.

Apparatus for cutting the cellular sheet into sections of suitable size comprises a conveyor 99 of belt or chain form having spaced transverse slats or bars 100 shown in Figs. 2 and 3 thereupon. The conveyor is trained about sprockets 101 upon shafts 102, one of which shafts preferably is driven by suitable means, e. g. sprocket gear 103.

Vertical supports 104 and 105 are disposed at the sides of the conveyor and at their upper extremities are interconnected by longitudinally-extending beams 106 and transversely-extending beams 107 (see Fig. 2), upon the latter of which are disposed tracks 108 in longitudinal relation with respect to the conveyor. A car comprising transverse bars 109 and longitudinal bars 110 is provided with axles 111, journaled in bars 110 and upon the extremities of the axles are secured wheels 112, that move upon the tracks 108.

Downwardly-extending tubular arms 113 are rigidly secured to the car (e. g. by welding to bars 109) and are provided with plugs 114, thus providing cylinders 115 for pistons 116 having downwardly-extending piston rods 117 secured thereto. Fluid under compression for actuating the piston rods downwardly is admitted to the cylinders through conduits 118. The pistons are actuated upwardly by means of helical springs 119 which are disposed about the piston rods and which are confined from displacement from the tubular portions by means of caps 121 upon the latter.

The lower portion of the piston rod which projects through the cap 121 is provided with a cross arm 122 having downwardly-projecting extremities or fingers 123. These fingers, when the piston rods 117 are in the lowest position, project between the slats 100 upon the conveyor 99 in such manner that as the conveyor moves forward with the sheet of material thereupon the car is also advanced in synchronism therewith. When the fingers 123 are disengaged from the slats of the conveyor the car is drawn to retracted or starting position by means of a cable 124 which is secured thereto and is trained about a sheave 126 which is journaled upon a bracket 127, upon upright 105. At its rear extremity the cable is provided with suitable weights 128 for actuating the car back to its neutral position.

A longitudinally-extending shaft 129 is disposed between the transverse members 109 and a cut-off arm 131 is journaled thereupon and is secured at its lower extremity to the frame of an electrical motor 132. The shaft 133 of the motor projects forwardly and is provided at its extremity with a cutting disk 134 which may be either a conventional circular saw or a thin abrasive disk. A semi-circular guard or housing 136 secured upon the adjacent arm 131 encloses the cutting disk for purposes of protecting the operator from possible injury thereby.

Cut-off arm 131 may be operated either manually or mechanically. For purposes of illustration is shown operating mechanism including a combination driving motor and speed-reducing mechanism 137, mounted upon a bar 138 extending between longitudinal members 110. The shaft 139 of this motor is provided with a conventional grooved pulley 140.

A transversely-extending arm 141 disposed upon the longitudinal frame members 110 is provided at its ends with downwardly-projecting portions 142, the lower extremities of which are slotted to receive grooved pulleys 143 journaled upon pins 144. A driving connection between the swinging arms 131 and the pulley 140 is provided by means of a cable 146 trained about the latter pulley and pulleys 143 and secured at its extremities to lugs 147 upon the frame of motor 132. Reversal of the direction movement of this cable for purposes of swinging the arms 131 either forwardly or backwardly may be secured by suitable reversing mechanism built into the reducing mechanism 137 or more simply by merely reversing the direction of rotation of the driving motor of the latter mechanism.

Blocks or slabs of cellular material after severance from the sheet upon the conveyor 99 are removed from the conveyor by sliding them upon rollers 148 upon a table 149.

In the operation of this embodiment of the apparatus, the furnace 10 is first heated to a suitable operating temperature which will depend upon the characteristics of the thermoplastic material which is being converted into a cellular mass and also upon the speed of operation of the apparatus. When this stage is reached the conveyor 14 in the furnace is actuated and simultaneously the chute 32 is vibrated in order to deposit a thin layer of finely divided but highly heat-resistant material such as sand upon the upper surface of the conveyor. Vibrator 39 is also actuated to deposit a layer of finely divided glass upon the freshly deposited film of refractory material.

The layer of finely divided glass then receives one or a plurality, as may be preferred, of layers of a mixture of refractory, but thermoplastic material such as glass or blast furnace slag and a suitable gassing agent such as calcium carbonate. This batch may comprise glass of the type ordinarily employed in fabricating sheet glass, which glass preferably is crushed to such a fineness that substantially all thereof will pass through a screen of about 28 meshes per inch and substantially all will be retained by a screen of approximately 100 meshes per inch. The calcium carbonate is of similar particle size and preferably comprises about 1½ per cent of the mixture. The mixture of calcium carbonate and crushed glass may be applied cold or may be preheated to any appropriate temperature e. g., 1200 or 1300° F.

After application of the mixture of pulverized glass and gassing agent, the covering layer 46 of molten glass is run upon the sheet from hopper 50a. During its travel through the furnace the layer of crushed glass deposited from the hopper 37 is fused down to a substantially continuous sheet which provides a smooth impervious working face for the lower surface of the cellular body. The mixture of crushed glass and gassing agent preferably is heated to a temperature above that of decomposition (about 1500°) of calcium carbonate, but below the temperature of complete liquefaction or melting of the glass. For glass of the composition of ordinary sheet glass this temperature lies within a range of 1600° to 1750° F. Within this range the material apparently assumes a plastic state, but the particles do not entirely fuse down to form a completely vitreous transparent mass. It would, of course, be possible to heat the sheet to a higher temperature, but the mass would then become more completely fused. The formation of the latter type of material is considered as constituting one phase of the present invention.

After passing through the furnace the freshly formed cellular body is conducted through the annealing leer 90 where it is gradually cooled down in such manner as to relieve excessive internal strains in the mass. After the material has been sufficiently cooled to admit of handling thereof it is passed from the leer upon the conveyor 99. There the pistons 116 are actuated to lower the bars 122 into engagement with the upper surface of the sheet and to bring the fingers 123 into engagement with the slats or bars 100 upon the conveyor. Movement of the conveyor then causes the cut-off car to travel forwardly in synchronism therewith and during such travel the swinging arm 131 is actuated to cause the disk 134 to sever the forward portion of the sheet from the mass. Subsequently the severed portion is run out upon the table 149, the cross arms 122 retracted and the cut-off allowed to return to its initial position under the urge of the weight 128.

The resultant cellular bodies may have a weight of 10 to 75 pounds per cubic foot or even more or less, depending upon the amounts of calcium carbonate employed and such like factors.

If the temperature of operation is maintained below that of complete fusion of the glass, the particles seem to sinter together, but do not lose their identity. The masses may be sawed and nailed without breakage and do not require external support. The blocks may even be used for structural purposes. Thermal insulating powers of the bodies are high.

In the form of the invention illustrated in Figure 5, the hopper for feeding crushed glass to form the lower surface of the sheet of cellular material is deleted. Similarly the hopper 50a for depositing a sheet of molten glass upon the mixture of calcium carbonate and glass in eliminated. In these embodiments of the apparatus a conveyor 150 corresponding to conveyor 14 is dusted or coated with a pulverulent refractory material by means of a vibratory feeder mechanism 151 corresponding to mechanism 34. A sheet of preformed glass 155 (see Fig. 5) is then run upon the conveyor by means of suitable conveyor mechanism including rollers 156, some or all of which are driven by any suitable mechanism (not shown).

One or more layers of a mixture of crushed glass and gassing agent such as calcium carbonate are then deposited upon this layer of sheet glass by means of one or more hopper mechanisms 157. In this embodiment of the invention the top or covering sheet of non-cellular glass may be omitted or if preferred it may be applied by mechanism such as is disclosed in Figure 4.

The mechanism includes a conveyor mechanism disclosed in Figure 4 comprising rollers 161 similar to the rollers 156 disclosed in Figure 5. The sheet of preformed glass from these rollers is pressed into contact with the cellular glass or with the mixture of crushed glass and calcium carbonate from which the cellular sheet is formed by means of a roller 162. This roller is journaled between downwardly-extending members 163 which extend through an opening 164 in the top of the forming furnace. The members 163 in turn are secured to a car 166 having wheels 167 travelling upon tracks 168 upon the top of the furnace.

The operation of this embodiment of this invention is essentially the same as that of the form disclosed in Figures 1, 2, and 3, except that the outer plates of non-cellular glass are supplied as preformed sheets which are heated approximately to the softening temperature before entering the furnace heating the mixture of crushed glass and gassing agent upon the conveyor. The forms of apparatus herein disclosed for practicing the invention are to be considered as being merely exemplary. It will be apparent to those skilled in the art that numerous modifications may be made therein without departure from the spirit of the invention or the scope of the appended claims.

What we claim is:

1. A process of forming cellular bodies, which process comprising spreading upon a continuously moving and heat resistant conveyor surface a thin layer of parting material, forming a molten sheet of glass at the same rate as the conveyor surface is moving, depositing it upon the conveyor, depositing upon said sheet a layer of a mixture of an agent decomposable by heat to form a gas and a finely-divided vitreous material in non-coherent state, said vitreous material having a temperature of sintering below and a temperature of complete melting above the decomposition temperature of the agent, heating the sheet and mixture upon the conveyor to a temperature above that of sintering of the material, but below that of complete melting, in order to decompose the agent and to bond the particles of material and to expand the resultant coherent mass into a cellular state by reason of the bubbles generated therein.

2. A process of forming cellular bodies, which process comprising spreading upon a continuously moving and heat-resistant conveyor surface a thin layer of parting material, forming a molten sheet of glass at the same rate as the conveyor surface is moving, depositing it upon the conveyor, depositing upon said sheet a layer of a mixture of an agent decomposable by heat to form a gas and a finely-divided vitreous material in non-coherent state, said vitreous material having a temperature of sintering below and a temperature of complete melting above the decomposition temperature of the agent, heating the sheet and mixture upon the conveyor to a temperature above that of sintering of the material, but below that of complete melting, in order to decompose the agent and to bond the particles of material and to expand the resultant coherent mass into a cellular state by reason of the bubbles generated therein, and applying to the upper surface of the coherent mass a sheet of glass heated to adherent state.

ROBERT A. MILLER.
WILLIAM O. LYTLE.